(12) United States Patent
Wurmfeld

(10) Patent No.: US 11,688,250 B2
(45) Date of Patent: Jun. 27, 2023

(54) SYSTEMS AND METHODS FOR DETECTING HUMAN PRESENCE NEAR A TRANSACTION KIOSK

(71) Applicant: Capital One Services, LLC, McLean, VA (US)

(72) Inventor: David Kelly Wurmfeld, Fairfax, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/381,116

(22) Filed: Jul. 20, 2021

(65) Prior Publication Data
US 2023/0025391 A1 Jan. 26, 2023

(51) Int. Cl.
G06V 40/16 (2022.01)
G07F 19/00 (2006.01)
G06F 21/32 (2013.01)

(52) U.S. Cl.
CPC ............ G07F 19/207 (2013.01); G06F 21/32 (2013.01); G06V 40/172 (2022.01)

(58) Field of Classification Search
CPC ..... G07F 19/207; G06F 21/32; G06V 40/172; G06Q 20/4015; H04L 63/1425; H04L 63/1475; H04L 63/107; H04L 63/0861; H04W 12/63
USPC .................................................. 235/379, 381
See application file for complete search history.

(56) References Cited

U.S. PATENT DOCUMENTS

| 6,731,778 B1 * | 5/2004 | Oda ..................... H04N 5/2254 396/326 |
| 7,494,053 B1 | 2/2009 | Burns |
| 7,575,166 B2 | 8/2009 | Mcnamara et al. |
| 8,317,092 B2 | 11/2012 | Ramachandran et al. |

(Continued)

FOREIGN PATENT DOCUMENTS

| CN | 204791266 U | * | 11/2015 | |
| GB | 2351590 A | * | 1/2001 | ............. G07F 19/20 |
| GB | 2517983 A | | 3/2015 | |

OTHER PUBLICATIONS

CN204791266U—An ATM theft-proof alarm system, 3 pages (Year: 2022).*

(Continued)

*Primary Examiner* — Tuyen K Vo
(74) *Attorney, Agent, or Firm* — Troutman Pepper Hamilton Sanders LLP; Christopher J. Forstner; John A. Morrissett

(57) ABSTRACT

Disclosed embodiments may include a system that may receive first level authentication data from a first user, identify a first user device associated with the first user, and determine whether a current location of the first user device is within a predetermined proximity of a first computing device. In response to the determination, the system may detect one or more objects within the predetermined proximity of the first computing device using the one or more positional sensors. The system may determine that at least one of the one or more objects is associated with a human, and in response, trigger a security measure. The system may transmit an indication of the triggered security measure to the first computing device, and may transmit instructions to the first user device configured to cause the first user device to provide an alert to the first user.

20 Claims, 7 Drawing Sheets

(56) References Cited

U.S. PATENT DOCUMENTS

| | | | |
|---|---|---|---|
| 8,348,151 B1 | 1/2013 | Block et al. | |
| 8,833,646 B1 * | 9/2014 | Crews | G06Q 20/1085 |
| | | | 902/4 |
| 9,564,985 B2 | 2/2017 | Ray et al. | |
| 10,121,331 B1 | 11/2018 | Hodges et al. | |
| 10,424,172 B2 | 9/2019 | Astigarraga et al. | |
| 10,467,604 B1 * | 11/2019 | Dorsch | G07F 19/20 |
| 10,769,897 B1 | 9/2020 | Miller | |
| 11,074,325 B1 * | 7/2021 | Duke | G06Q 20/4016 |
| 11,120,121 B1 * | 9/2021 | Montenegro | G07F 19/207 |
| 11,222,514 B1 * | 1/2022 | Young | G06Q 20/18 |
| 2014/0078164 A1 * | 3/2014 | Chan | G09G 5/30 |
| | | | 345/589 |
| 2018/0247483 A1 | 8/2018 | Lindsay | |
| 2019/0095925 A1 | 3/2019 | Gabriele et al. | |
| 2019/0164165 A1 | 5/2019 | Ithabathula | |
| 2020/0084040 A1 * | 3/2020 | Fish | G06Q 20/40 |

OTHER PUBLICATIONS

Extended European Search Report in related EP Application No. 22185095.1 dated Jan. 3, 2023.
Laoudias, C. et al., "A Survey of Enabling Technologies for Network Localization, Tracking, and Navigation," IEEE Communications Surveys & Tutorials, vol. 20, No. 4, Nov. 19, 2018.

* cited by examiner

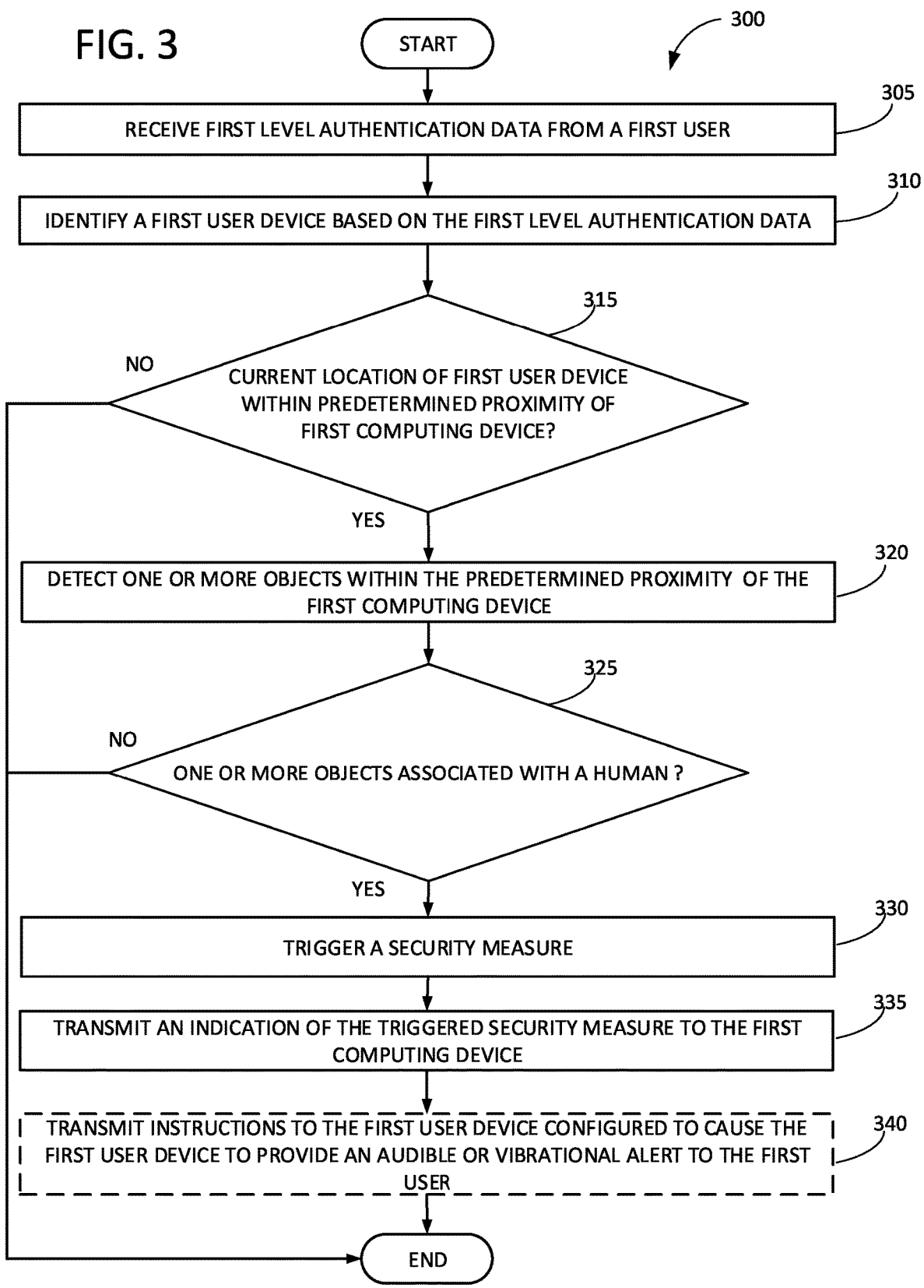

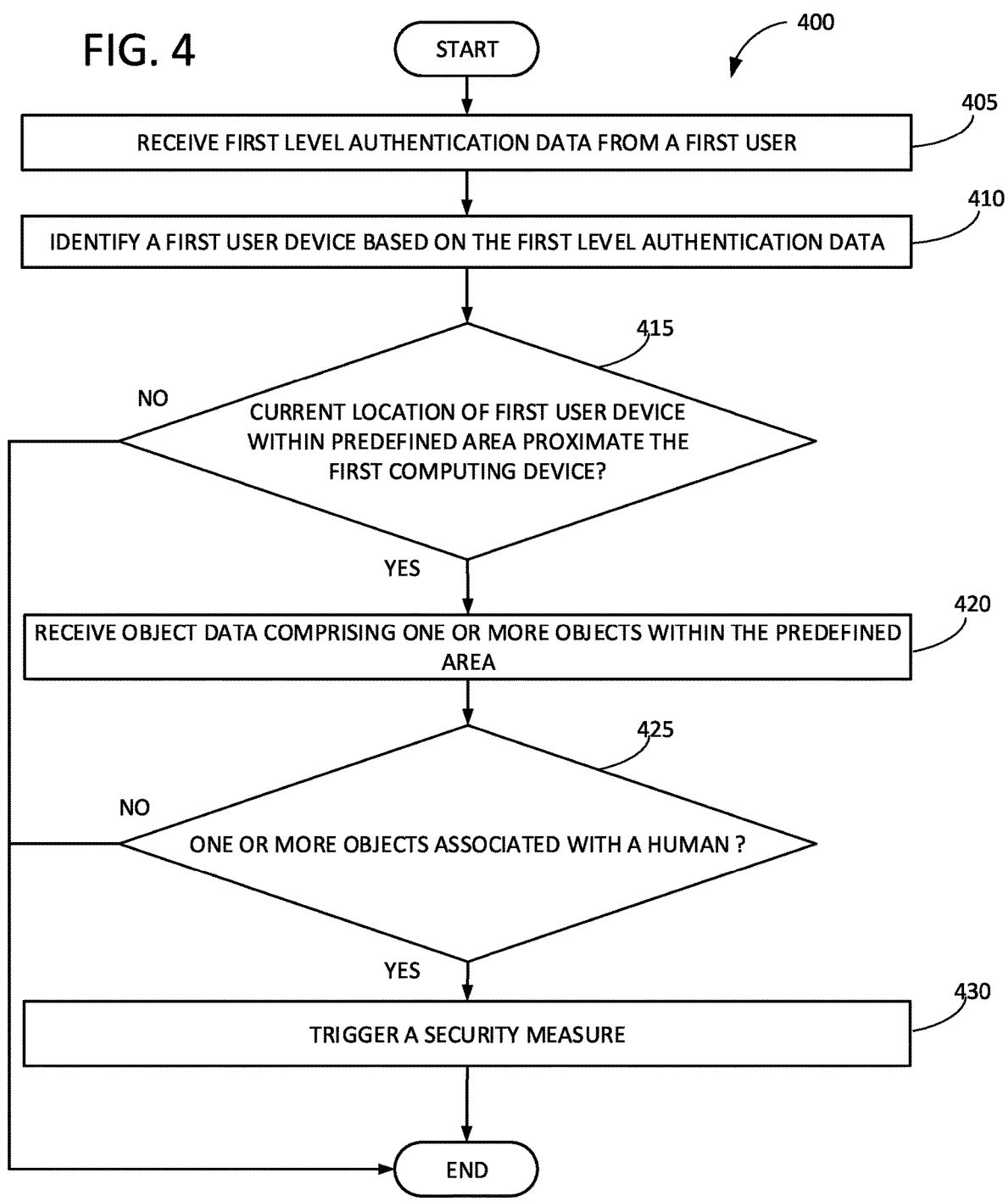

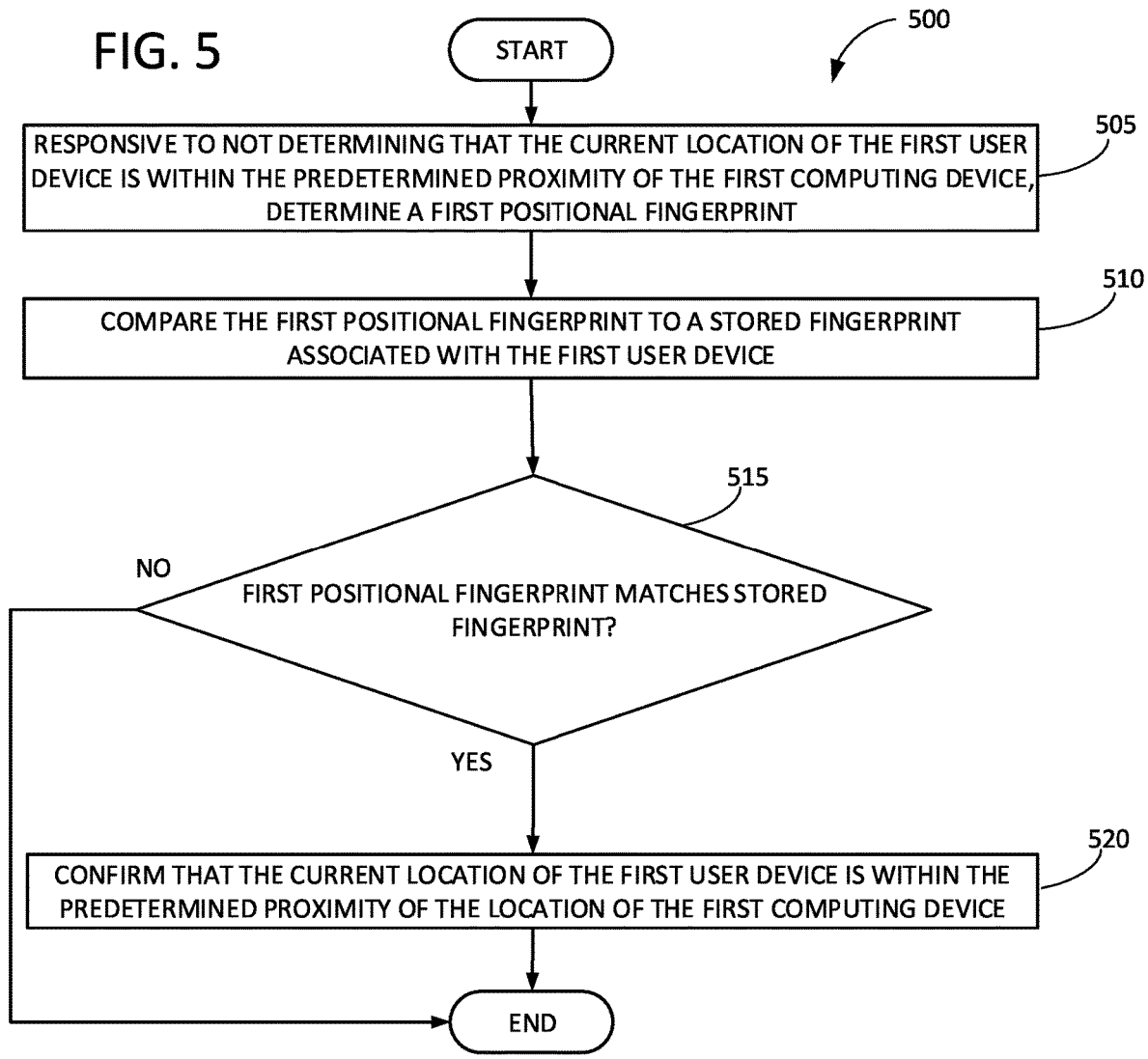

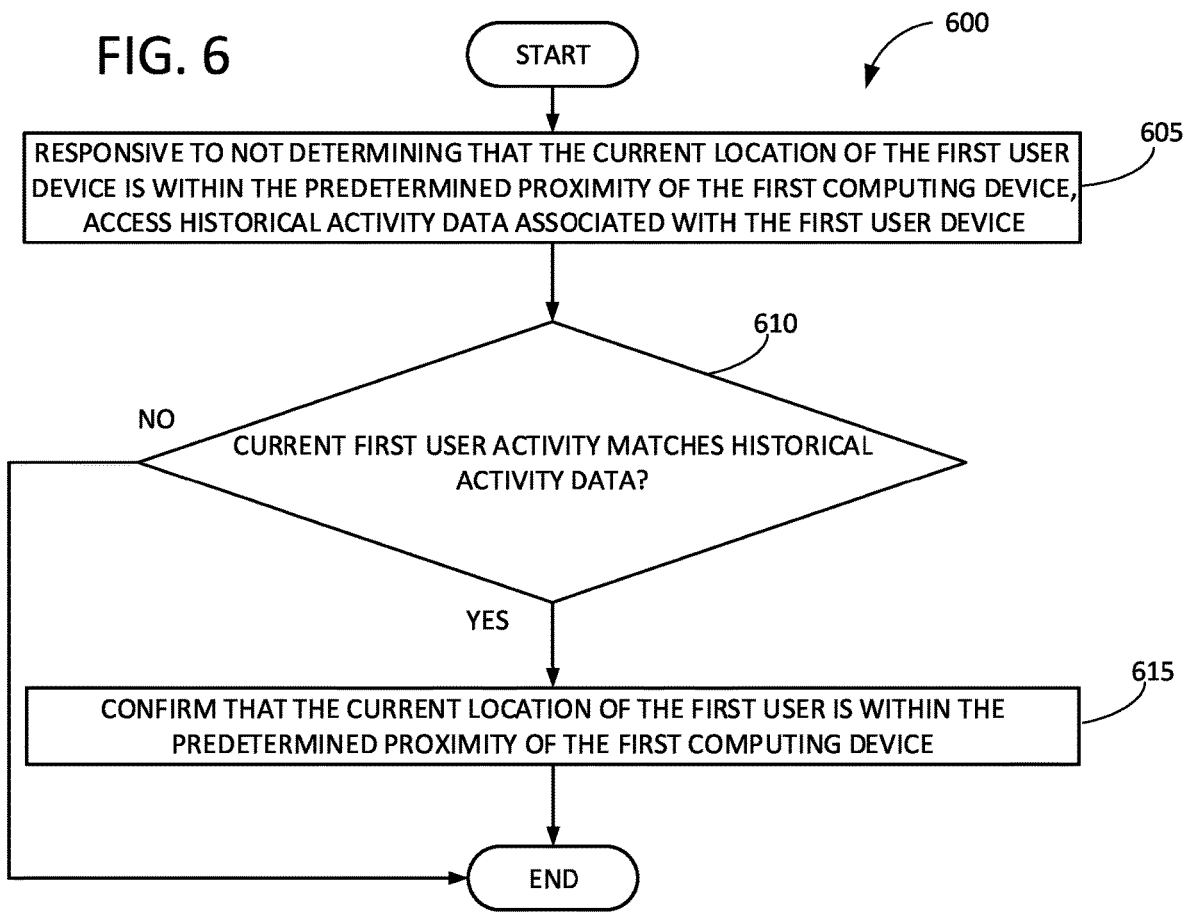

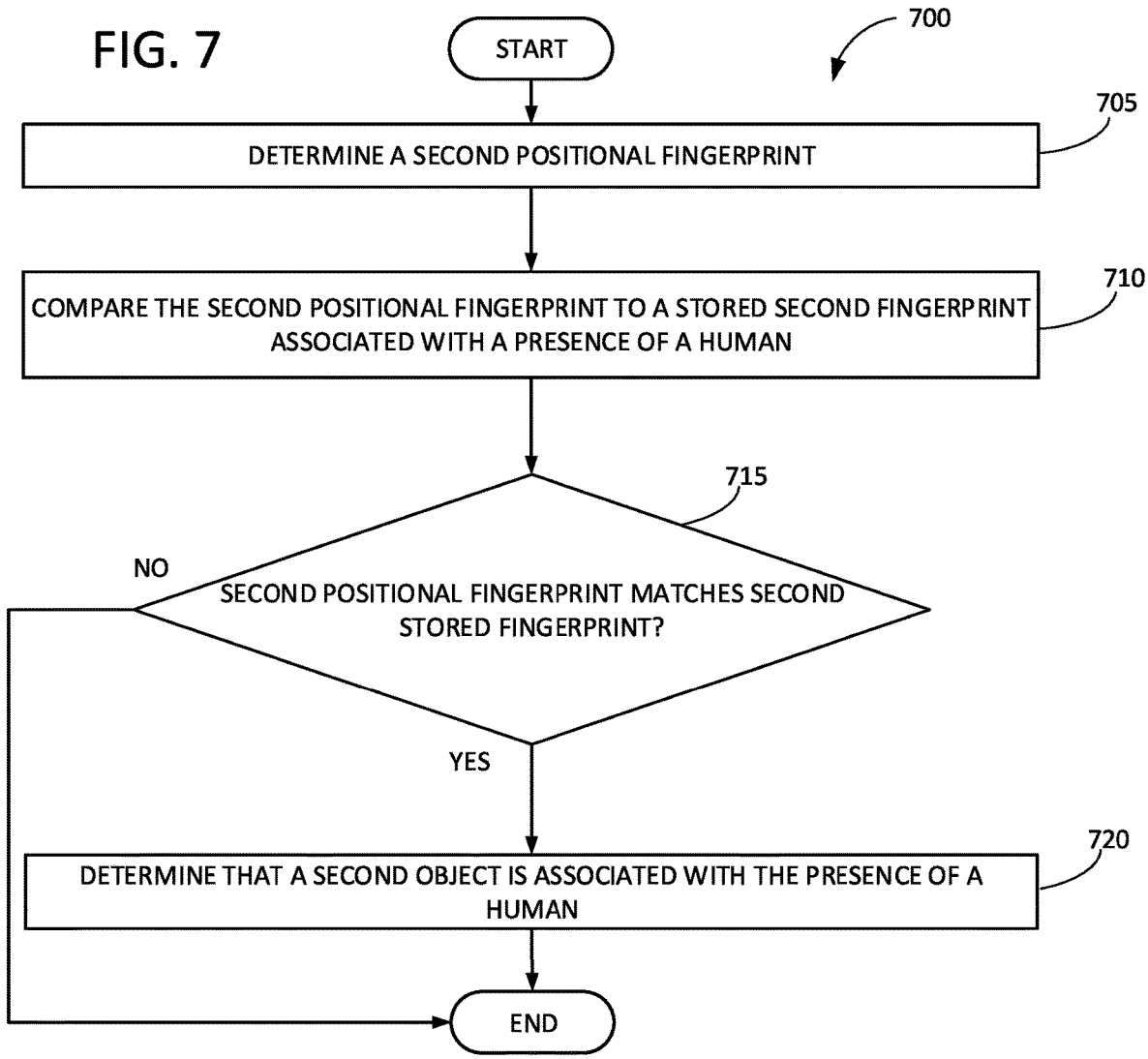

SYSTEMS AND METHODS FOR DETECTING HUMAN PRESENCE NEAR A TRANSACTION KIOSK

FIELD

The disclosed technology relates to systems and methods for detecting the presence of a human near a transaction kiosk. In particular, the disclosed technology relates to determining when a potential eavesdropper is within a predetermined proximity of an in-use transaction kiosk and alerting an authorized user of the presence of the potential eavesdropper.

BACKGROUND

Customers often visit automated teller machines (ATMs) and other transaction kiosks located in high traffic areas. While high traffic areas tend to be convenient locations for ATMs and transaction kiosks, customers accessing an ATM or transaction kiosk in a high traffic area pose the risk of inadvertently exposing their private financial information (e.g., password, PIN, account balance, etc.) to a potential eavesdropper while interacting with the ATM or transaction kiosk. Current practices do not provide a way to dynamically detect the presence of a potential eavesdropper during an ATM or kiosk transaction and alert the user of the presence of the potential eavesdropper.

Accordingly, there is a need for improving the security of the ATM and transaction kiosk experience to detect the presence of an eavesdropper and alert a customer of their presence. Embodiments of the present disclosure are directed to this and other considerations.

SUMMARY

Disclosed embodiments may include a system for alerting a customer of the presence of a potential eavesdropper during an ATM or kiosk transaction. The system may include one or more processors, one or more positional sensors configured to communicate with the one or more processors, and a memory in communication with the one or more processors and storing instructions that are configured to cause the system to perform the steps of a method. For example, the system may receive first level authentication data from a first user and identify a first user device associated with the first user based on the first level authentication data. The system may determine whether a current location of the first user device is within a predetermined proximity of a first computing device. When the system determines that the current location of the first user device is within the predetermined proximity of the first computing device, the system may detect one or more objects within the predetermined proximity of the first computing device using one or more positional sensors. The system may determine that at least one of the one or more objects is associated with a human, and in response to the determination, trigger a security measure, and transmit an indication of the triggered security measure to the first computing device.

Disclosed embodiments, may include a system for alerting a customer of the presence of a potential eavesdropper during an ATM or kiosk transaction. The system may include one or more processors, and a memory in communication with the one or more processors and storing instructions that, when executed by the one or more processors are configured to cause the system to perform the steps of a method. For example, the system may receive first level authentication data form a first user, and identify a first user device associated with the first user based on the first level authentication data. The system may determine whether a current location of the first user device is within a predefined area proximate a first computing device. In response to determining that the current location of the first user device is within the predefined area proximate the first computing device, the system may receive object data associated with one or more objects within the predefined area. The system may determine that at least one of the one or more objects is associated with a human and, responsive to the determination, trigger a security measure.

Disclosed embodiments may include a method for alerting a customer of the presence of a potential eavesdropper during an ATM or kiosk transaction. The method may include receiving first level authentication data from a first user, and identifying a first user device associated with the first user based on the first level authentication data. The method may include determining whether a current location of the first user device is within a predetermined perimeter around a first computing device. In response to determining that the current location of the first user device is within the predetermined perimeter around the first computing device, the method may include detecting, with one or more positional sensors positioned within the predetermined perimeter around the first computing device, one or more objects within the predetermined perimeter around the first computing device. The method may include determining that at least one of the one or more objects is associated with a human, and in response to the determination, triggering a security measure. The method may include transmitting an indication of the triggered security measure to the first computing device and transmitting instructions to the first user device configured to cause the first user device to provide an audible or vibrational alert to the first user.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings:

FIG. 3 is a flow diagram illustrating an exemplary method for triggering a security measure in response to detecting one or more objects associated with a human, in accordance with certain embodiments of the disclosed technology.

FIG. 4 is a flow diagram illustrating an exemplary method for triggering a security measure in response to detecting one or more objects associated with a human, in accordance with certain embodiments of the disclosed technology.

FIG. 5 is a flow diagram illustrating an exemplary method for confirming that the current location of the first user device is within the predetermined proximity of the location of the first computing device, in accordance with certain embodiments of the disclosed technology.

FIG. 6 is a flow diagram illustrating an exemplary method for confirming that the current location of the first user device is within the predetermined proximity of the location of the computing device, in accordance with certain embodiments of the disclosed technology.

FIG. 7 is a flow diagram illustrating an exemplary method for determining that a second object is associated with the presence of a human, in accordance with certain embodiments of the disclosed technology.

DETAILED DESCRIPTION

Figure 1:
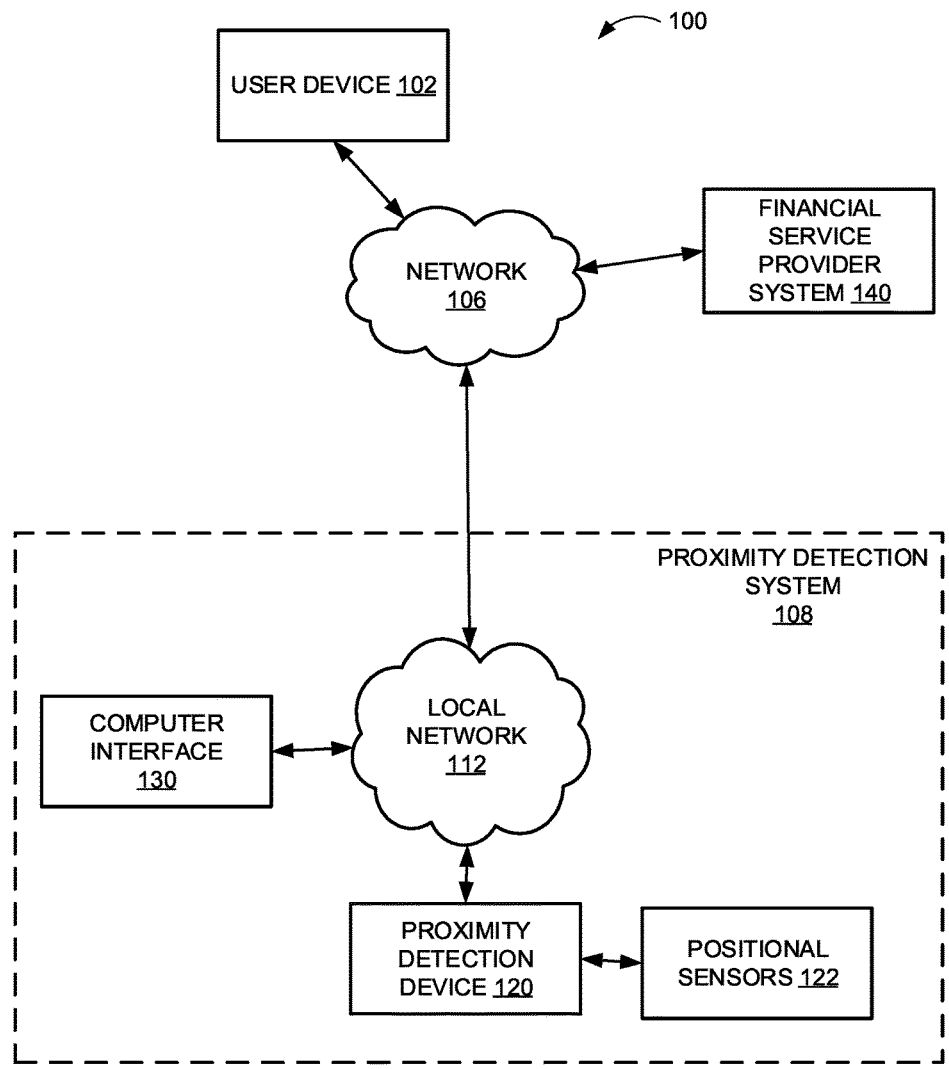
FIG. 1 is a block diagram of an example system that may be used to alert a customer of the presence of a potential eavesdropper, according to an example implementation of the disclosed technology.

Examples of the present disclosure relate generally to determining when a potential eavesdropper is within a predetermined proximity of an in-use transaction kiosk or ATM and alerting an authorized user of the presence of the potential eavesdropper. The systems and methods described herein are necessarily rooted in computer technology as they relate to dynamically detecting one or more objects within a predetermined proximity of a transaction kiosk, and determining that at least one of the one or more objects is a human after confirming the presence of a first user interacting with the transaction kiosk. In some instances, the system utilizes a machine learning model to determine that at least one of the detecting objects is a human. Machine learning models are a unique computer technology that involves training the models to complete a task, such as determining a detected object is a human, by feeding the models with labeled data sets so the machine learning models learn how to rank or score the training data sets and apply the same ranking or scoring to unlabeled data sets. Importantly, examples of the present disclosure improve the speed with which computers can identify a detected object as a human potential eavesdropper and trigger a security measure based on the presence of the potential eavesdropper based on the score the machine learning model generates. According to some embodiments, the system may receive first level authentication data from a first user, identify a first user device associated with the first user, and determine whether the current location of the first user device is within a predetermined proximity to a transaction kiosk. The system may detect one or more objects within the predetermined proximity of the transaction kiosk using positional sensors. The system may collect positional fingerprint data associated with each of the one or more detected objects while the transaction kiosk is in use by the first user. When the system determines that the collected positional fingerprint data matches stored fingerprint data associated with the presence of a human, the system may automatically trigger a security measure to alert the first user of the presence of a potential eavesdropper.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 is a block diagram of an example system that may be used alert a customer of the presence of a potential eavesdropper, according to an example implementation of the disclosed technology. The components and arrangements shown in FIG. 1 are not intended to limit the disclosed embodiments as the components used to implement the disclosed processes and features may vary. As shown, proximity detection system 108 may interact with a user device 102 and a financial service provider system 140 via a network 106. In certain example implementations, the proximity detection system 108 may include a local network 112, a proximity detection device 120, a computer interface 130, and positional sensors 122.

In some embodiments, a user may operate the user device 102. The user device 102 can include one or more of a mobile device, smart phone, general purpose computer, tablet computer, laptop computer, telephone, PSTN landline, smart wearable device, voice command device, other mobile computing device, or any other device capable of communicating with the network 106 and ultimately communicating with one or more components of the proximity detection system 108. In some embodiments, the user device 102 may include or incorporate electronic communication devices for hearing or vision impaired users.

Customers may include individuals such as, for example, subscribers, clients, prospective clients, or customers of an entity associated with an organization, such as individuals who have obtained, will obtain, or may obtain a product, service, or consultation from or conduct a transaction in relation to an entity associated with the proximity detection system 108. According to some embodiments, the user device 102 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The network 106 may be of any suitable type, including individual connections via the internet such as cellular or WiFi networks. In some embodiments, the network 106 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 106 may include any type of computer networking arrangement used to exchange data. For example, the network 106 may be the Internet, a private data network, virtual private network using a public network, and/or other suitable connection(s) that enable(s) components in the system 100 environment to send and receive information between the components of the system 100. The network 106 may also include a public switched telephone network ("PSTN") and/or a wireless network.

The proximity detection system 108 may be associated with and optionally controlled by one or more entities such as a business, corporation, individual, partnership, or any other entity that provides one or more of goods, services, and consultations to individuals such as customers. The proximity detection system 108 may include one or more servers and computer systems for performing one or more functions associated with products and/or services that the organization provides.

The local network 112 may include any type of computer networking arrangement used to exchange data in a localized area, such as WiFi, Bluetooth™ Ethernet, and other suitable network connections that enable components of the proximity detection system 108 to interact with one another and to connect to the network 106 for interacting with components in the system 100 environment. In some embodiments, the local network 112 may include an interface for communicating with or linking to the network 106. In other embodiments, certain components of the proximity detection system 108 may communicate via the network 106, without a separate local network 112.

In accordance with certain example implementations of the disclosed technology, the proximity detection system 108 may include one or more computer systems configured to compile data from a plurality of sources including the proximity detection device 120, computer interface 130, and/or the positional sensors 122. The proximity detection device 120 may correlate compiled data, analyze the compiled data, arrange the compiled data, generate derived data based on the compiled data, and store the compiled and derived data in a database, such as the database 260, as described more fully with respect to FIG. 2. According to some embodiments, the database 260 may be a database associated with an organization and/or a related entity that stores a variety of information relating to customers, transactions, ATM, and business operations.

The positional sensors 122 may include sensors located within a predetermined proximity of the computer interface 130 and configured to collect positional data associated with a user and proximity data associated with one or more objects detected within a predetermined proximity of the computer interface 130. For example, the positional sensors 122 may include one or more of a LIDAR positional sensor, ultrasound positional sensor, capacitive positional sensor, resistive positional sensor, and radio-frequency positional sensor. The data collected by positional sensors 122 may be stored as a fingerprint that the system 100 (e.g., proximity detection device 120) may utilize to detect one or more objects and determine whether at least one of the one or more detected objects correspond to a human. For example, a LIDAR positional sensor may be used to create a 3-dimensional scan of the area surrounding the computer interface 130. Newly collected LIDAR positional data may be compared to stored LIDAR positional data to identify the presence of a human. The ultrasound positional sensor may be utilized in a similar manner. The capacitive positional sensor may be configured to measure a change in the electrical property known as capacitance and may be placed in the floor or ground directly proximate the computer interface 130 and may additionally include a reference target positioned above the capacitive sensor. When a human or other entity walks onto the ground over the capacitive sensor and between the capacitive sensor and the reference target, the capacitive sensor may detect a change in capacitance due to the entity or human having a different dielectric constant than air. The resistive positional sensor may also be installed into the floor or ground directly proximate the computer interface 130 and may employ a small electrical current to detect a change in resistive properties of the ground or floor surface as a human or other entity walks over the surface. Finally, a radio-frequency positional sensor may detect a change in a radio-frequency profile in a given area when an object (e.g., a human or other entity) enters a given area and changes a background radio-frequency reading.

Figure 2:
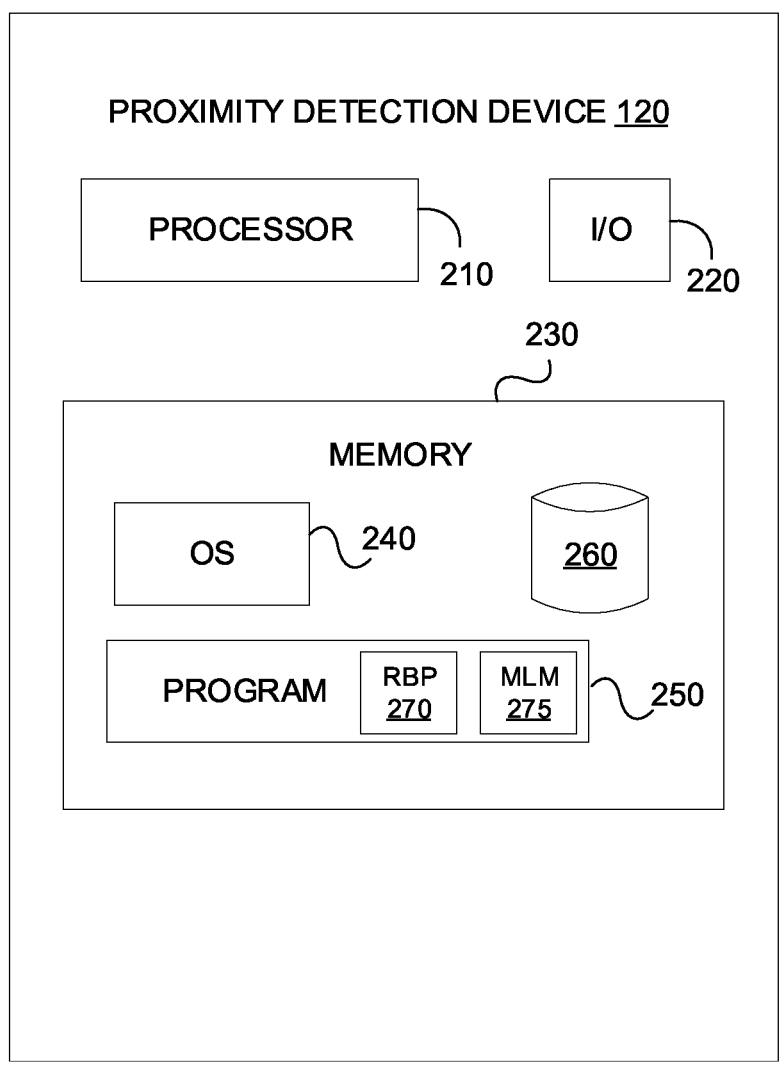
FIG. 2 is a block diagram of an example proximity detection device used to detect the presence of a potential eavesdropper, according to an example implementation of the disclosed technology.

FIG. 2 is a block diagram of an example proximity detection device 120 used to detect the presence of a potential eavesdropper within a predetermined proximity of an ATM or transaction kiosk, according to an example implementation of the disclosed technology. According to some embodiments, the user device 102, computer interface 130, and financial service provider system 140, as described with respect to FIG. 1, may have a similar structure and components that are similar to those described with respect to proximity detection device 120 shown in FIG. 2. As shown, the proximity detection device 120 may include a processor 210, an input/output ("I/O") device 220, a memory 230 containing an operating system ("OS") 240 and a program 250. In certain example implementations, the proximity detection device 120 may be a single server or may be configured as a distributed computer system including multiple servers or computers that interoperate to perform one or more of the processes and functionalities associated with the disclosed embodiments. In some embodiments proximity detection device 120 may be one or more servers from a serverless or scaling server system. In some embodiments, the proximity detection device 120 may further include a peripheral interface, a transceiver, a mobile network interface in communication with the processor 210, a bus configured to facilitate communication between the various components of the proximity detection device 120, and a power source configured to power one or more components of the proximity detection device 120.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 230.

The processor 210 may be one or more known processing devices, such as, but not limited to, a microprocessor from the Pentium™ family manufactured by Intel™ or the Turion™ family manufactured by AMD™. The processor 210 may constitute a single core or multiple core processor that executes parallel processes simultaneously. For example, the processor 210 may be a single core processor that is configured with virtual processing technologies. In certain embodiments, the processor 210 may use logical processors to simultaneously execute and control multiple processes. The processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the proximity detection device 120 may include one or more storage devices configured to store information used by the processor 210 (or other components) to perform certain functions related to the disclosed embodiments. In one example, the proximity detection device 120 may include the memory 230 that includes instructions to enable the processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the proximity detection device 120 may include a memory 230 that includes instructions that, when executed by the processor 210, perform one or more processes consistent with the functionalities disclosed herein. Methods, systems, and articles of manufacture consistent with disclosed embodiments are not limited to separate programs or computers configured to perform dedicated tasks. For example, the proximity detection device 120 may include the memory 230 that may include one or more programs 250 to perform one or more functions of the disclosed embodiments.

In certain example implementations, the program 250 may include a rule-based platform 270 for determining whether an identified object corresponds to a human using a set of predefined rules. In some embodiments, the proximity detection device 120 may include a trained machine learning model 275 for determining whether an identified object corresponds to a human, in accordance with a model that may be continuously or intermittently updated. Moreover, the processor 210 may execute one or more programs 250 located remotely from the system 100 (such as the system shown in FIG. 1). For example, the system 100 may access one or more remote programs 250 (such as the rule-based platform 270 or the trained machine learning model 275), that, when executed, perform functions related to disclosed embodiments.

The memory 230 may include one or more memory devices that store data and instructions used to perform one or more features of the disclosed embodiments. The memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 230 may include software components that, when executed by the processor 210, perform one or more processes consistent with the disclosed embodiments. In some embodiments, the memory 230 may include a database 260 for storing data related to training datasets for determining whether objects detected are human to enable the proximity detection device 120 to perform one or more of the processes and functionalities associated with the disclosed embodiments.

The database 260 may include stored data relating to training datasets (e.g., labeled training datasets that are configured to train the proximity detection device 120 to determine whether a detected object is a human), positional fingerprint data (for identifying a user of the computer interface 130 and/or identifying the presence of a human eavesdropper), and historical activity data associated with a user of a transaction kiosk/ATM (e.g., computer interface 130). According to some embodiments, the functions provided by the database 460 may also be provided by a database that is external to the proximity detection device 120.

The proximity detection device 120 may also be communicatively connected to one or more memory devices (e.g., databases) locally or through a network. The remote memory devices may be configured to store information and may be accessed and/or managed by the proximity detection device 120. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The proximity detection device 120 may also include one or more I/O devices 220 that may comprise one or more interfaces for receiving signals or input from devices and providing signals or output to one or more devices that allow data to be received and/or transmitted by the proximity detection device 120. For example, the proximity detection device 120 may include interface components, which may provide interfaces to one or more input devices, such as one or more keyboards, mouse devices, touch screens, track pads, trackballs, scroll wheels, digital cameras, microphones, sensors, and the like, that enable the proximity detection device 120 to receive data from a user (such as, for example, via the user device 102), computer interface 130, and/or positional sensors 122.

In example embodiments of the disclosed technology, the proximity detection device 120 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the proximity detection device 120 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the proximity detection device 120 may include a greater or lesser number of components than those illustrated.

FIG. 3 is a flow diagram illustrating an exemplary method for triggering a security measure in response to detecting one or more objects associated with a human, in accordance with certain embodiments of the disclosed technology. The steps of method 300 may be performed by one or more components of the system 100 (e.g., proximity detection device 120 or computer interface 530 of proximity detection system 108 and/or user device 102 and financial service provider system 140).

In block 305, the system (e.g., computer interface 130) may receive first level authentication data from a first user. For example, the user may input a username and password, security PIN, or may swipe a card associated with an account of the first user.

In block 310, the system may identify a first user device based on the first level authentication data. For example, the computer interface 130 may query a financial service provider 140 to determine a mobile device (e.g., user device 102) associated with the first user. Financial service provider 140 may have a record of a phone number associated with a mobile device of the first user. Additionally, financial service provider 140 may provide an application that may be installed on the user device 102 that may allow financial service provider to determine certain information associated with the user device 102, such as GPS location data.

In decision block 315, the system may determine whether the current location of the first user device is within a predetermined proximity of the first computing device (e.g., computer interface 130). For example, one or more components of the system (e.g., proximity detection device 120 and/or computer interface 130) may query the financial service provider system 140 to determine a current location of the user device 102. When the current location of the first user device (user device 102) is not within the predetermined proximity of the first computing device (computer interface 130), the method may end.

When the current location of user device 102 is within the predetermined proximity of the computer interface 130, the system (e.g., proximity detection device 120) may detect one or more objects within the predetermined proximity of the first computing device (computer interface 130) in block 320. For example, the system may use one or more positional sensors (e.g., positional sensors 122) to detect one or more objects within the predetermined proximity of the computer interface 130. According to some embodiments, the user of user device 102 may indicate whether one or more of the detected objects corresponds to an entity that is not an eavesdropper. For example, if the user is accompanied by a child, a pet, or friends, the user may indicate their presence as verified objects within an application provided on the user device 102. Accordingly, once these objects have been identified as not an eavesdropper by the user using user device 102, the system may not trigger a security measure even based on the presence of the verified objects.

In decision block 325, the system may determine whether one or more objects are associated with a human. When the system determines that one or more objects are not associated with a human, the method may end. For example, the system (e.g., proximity detection system 120) may use the positional sensors 122 (e.g., LIDAR, ultrasound, capacitive, resistive, radio-frequency, etc.) and one or more of machine learning model 275 and/or rule-based platform 270 to determine whether the one or more objects are associated with a human by determining whether recorded positional fingerprints match a stored fingerprint associated with the presence of a human beyond a predetermined threshold of similarity.

When at least one of the one or more objects are determined to be a human, the system (e.g., proximity detection device 120) may trigger a security measure in step 330. For example, the triggered security measure may include one or more of causing a display of computer interface 130 to flash, causing the display of computer interface 130 to temporarily display an empty screen and/or causing the display of computer interface 130 to identify a position associated with a presence of the human within the predefined area. For example, the display may indicate the presence of a human with a conspicuous arrow pointing in the direction of the detected human.

In step 335, the system (e.g., proximity detection device 120) may transmit an indication of the triggered security measure to the first computing device (e.g., computer interface 130). In optional step 340, the system (e.g., proximity detection device 120) may transmit instructions to the first user device (user device 102) that are configured to cause the first user device to provide an audible or vibrational alert to the first user.

FIG. 4 is a flow diagram illustrating an exemplary method for triggering a security measure in response to detecting one or more objects associated with a human, in accordance with certain embodiments of the disclosed technology. The steps of method 300 may be performed by one or more components of the system 100 (e.g., proximity detection device 120 or computer interface 530 of proximity detection system 108 and/or user device 102 and financial service provider system 140).

Method 400 of FIG. 4 is similar to method 300 of FIG. 3. For example, blocks 405, 410, 415, 425, and 430 are substantially similar to blocks 305, 310, 315, 325, and 330 and are not repeated herein for brevity. In block 420, the system may receive object data including one or more objects within the predefined area proximate the first computing device. For example, the object data may be received from one or more positional sensors, which may include LIDAR sensors, ultrasound sensors, capacitive sensors, resistive sensors, radio-frequency sensors, etc.

FIG. 5 is a flow diagram illustrating an exemplary method for confirming that the current location of the first user device is within the predetermined proximity of the location of the first computing device, in accordance with certain embodiments of the disclosed technology. The steps of method 500 may be performed by one or more components of the system 100 (e.g., proximity detection device 120 or computer interface 530 of proximity detection system 108 and/or user device 102 and financial service provider system 140).

In block 505, in response to not determining that the current location of the first user device (e.g. user device 102) is within the predetermined proximity of the first computing device (e.g., computer interface 130), the system may determine a first positional fingerprint. For example, the system may use one or more positional sensors (e.g., positional sensors 122) to determine the first positional fingerprint for the first user.

In block 510, the system may compare the first positional fingerprint to a stored fingerprint associated with the first user device.

In decision block 515, the system may determine whether the first positional fingerprint matches a stored positional fingerprint associated with the first user. For example, the system may compare the fingerprints captured by the positional sensors 122 (e.g., LIDAR, resistive, capacitive, etc.) to the stored fingerprints associated with a stored profile for the first user (e.g., stored on database 260 and/or financial service provider 140).

When the first positional fingerprint matches the stored fingerprint beyond a predetermined threshold, the system may confirm that the current location of the first user device (e.g., user device 102) is within the predetermined proximity of the location of the first computing device (e.g., computer interface 130) in block 520. When the first positional fingerprint does not match the stored fingerprint beyond the predetermined threshold, the method may end.

FIG. 6 is a flow diagram illustrating an exemplary method for confirming that the current location of the first user device is within the predetermined proximity of the location of the computing device, in accordance with certain embodiments of the disclosed technology. The steps of method 600 may be performed by one or more components of the system 100 (e.g., proximity detection device 120 or computer interface 530 of proximity detection system 108 and/or user device 102 and financial service provider system 140).

In block 605, responsive to not determining that the current location of the first user device is within the predetermined proximity of the first computing device, the system may access historical activity data associated with the first user device. For example, historical activity data may be stored on financial service provider system 140 and the historical activity data may be queried by one of computer interface 130 and/or proximity detection device 120. Historical activity data may be data indicative of times, dates, and patterns of use of a respective ATM, kiosk, and/or computer interface.

In decision block 610, the system may determine whether current first user activity data matches stored historical activity data. Current first user activity data may be data may be determined in response to receiving first level authentication from a first user as described with respect to step 305 in FIG. 3.

When the current first user activity data matches historical activity data beyond a predetermined threshold of similarity, the system may confirm that the current location of the first user is within the predetermined proximity of the first computing device (e.g., computer interface 130) in block 615. When the current first user activity data does not match historical activity data beyond the predetermined threshold of similarity, the method may end.

FIG. 7 is a flow diagram illustrating an exemplary method for determining that a second object is associated with the presence of a human, in accordance with certain embodiments of the disclosed technology. The steps of method 700 may be performed by one or more components of the system 100 (e.g., proximity detection device 120 or computer interface 530 of proximity detection system 108 and/or user device 102 and financial service provider system 140).

In block 705, the system may determine a second positional fingerprint for each of the one or more detected objects. The second positional fingerprint may be collected using one or more positional sensors (e.g., positional sensors 122), as described with respect to FIG. 1. The second positional fingerprint may indicate the presence, or absence, of one or more humans within the predetermined proximity of computer interface 130.

In block 710, the system may compare the second positional fingerprint(s) to a stored second fingerprint associated with a presence of a human. For example, the stored second fingerprint may be stored on database 260 and/or on financial service provider system 140.

In decision block 715, the system may determine whether the second positional fingerprint(s) matches the second stored fingerprint beyond a predetermined threshold of similarity. In response to the second positional fingerprint(s) matching the second stored fingerprint beyond the predetermined threshold of similarity, the system may determine that a second object is associated with the presence of a human in block 720. When the second positional fingerprint(s) do not match the second stored fingerprint beyond the predetermined threshold of similarity, the method may end.

Examples of the present disclosure can be implemented according to at least the following clauses:

Clause 1: A system comprising: one or more processors; one or more positional sensors configured to communicate with the one or more processors; a memory in communication with the one or more processors and storing instructions that, when executed by the one or more processors, are configured to cause the system to: receive first level authentication data from a first user; based on the first level authentication data, identify a first user device associated with the first user; determine whether a current location of the first user device is within a predetermined proximity of a first computing device; responsive to determining that the current location of the first user device is within the predetermined proximity of the first computing device, detect one or more objects within the predetermined proximity of the first computing device using the one or more positional sensors; determine that at least one of the one or more objects is associated with a human; responsive to the determination, trigger a security measure; and transmit a an indication of the triggered security measure to the first computing device.

Clause 2: The system of clause 1, wherein the memory includes instructions that, when executed by the one or more processors are configured to cause the system to: responsive to not determining that the current location of the first user device is within the predetermined proximity of the first computing device, determine a first positional fingerprint associated with the first user; compare the first positional fingerprint to a stored fingerprint associated with the first user; responsive to the first positional fingerprint matching the stored fingerprint beyond a first predetermined threshold, confirm that the current location of the first user device is within the predetermined proximity of the first computing device.

Clause 3: The system of clause 2, wherein the first positional fingerprint and the stored fingerprint each comprise a data type selected from LIDAR fingerprint data, ultrasound fingerprint data, capacitive fingerprint data; resistive fingerprint data, radio-frequency (RF) fingerprint data, facial recognition fingerprint data, or combinations thereof.

Clause 4: The system of clause 1, wherein the memory includes instructions that, when executed by the one or more processors are configured to cause the system to: responsive to not determining that the current location of the first user device is within the predetermined proximity of the first computing device, access stored activity data associated with the first user; determine whether current first user activity associated with the first user device matches stored activity data associated with the first user; responsive to the current activity matching the stored activity data beyond a second predetermined threshold, confirm the current location of the first user device is within the predetermined proximity of the first computing device.

Clause 5: The system of clause 1, wherein determining that at least one of the one or more objects is associated with a human further comprises, for each of the one or more objects: determining a second positional fingerprint; comparing the second positional fingerprint to a stored fingerprint associated with a presence of a human; and determining that a second object is associated with the presence of a human based on the second positional fingerprint matching the stored second fingerprint beyond a third predetermined threshold.

Clause 6: The system of clause 5, further comprising a trained machine learning model configured to determine the presence of a human based on the comparison of one or more second positional fingerprints to the stored second fingerprint.

Clause 7: The system of clause 1, wherein the security measures comprises one or more actions selected from (i) causing a display associated with the first computing device to flash, (ii) causing the display to temporarily display an empty screen, or (iii) causing the display to identify a position associated with a presence of the human within the predetermined proximity of the first computing device.

Clause 8: The system of clause 1, wherein an indication of the triggered security measure is additionally transmitted to the first user device, causing the first user device to provide an audible or vibrational alert to the first user.

Clause 9: A system comprising: one or more processors; a memory in communication with the one or more processors and storing instructions that, when executed by the one or more processors, are configured to cause the system to: receive first level authentication data from a first user; based on the first level authentication data, identify a first user device associated with the first user; determine whether a current location is within a predefined area proximate a first computing device; responsive to determining that the current location of the first user device is within the predefined area proximate the first computing device, receive object data comprising one or more objects within the predefined area; determine that at least one of the one or more objects is associated with a human; and responsive to the determination, trigger a security measure.

Clause 10: The system of clause 9, wherein the memory includes instructions that, when executed by the one or more processors are configured to cause the system to: responsive to not determining that the current location of the first user device is within the predefined area proximate the first computing device, determine a first positional fingerprint; compare the first positional fingerprint to a stored fingerprint associated with the first user device; responsive to the first positional fingerprint matching the stored fingerprint beyond a first predetermined threshold, confirm that the current location of the first user device is within the predefined area.

Clause 11: The system of clause 10, wherein the first positional fingerprint and the stored fingerprint each comprise a data type selected from LIDAR fingerprint data, ultrasound fingerprint data, capacitive fingerprint data, resistive fingerprint data, radio-frequency (RF) fingerprint data, facial recognition fingerprint data, or combinations thereof.

Clause 12: The system of clause 9, wherein the memory includes instructions that, when executed by the one or more processors are configured to cause the system to: responsive to not determining that the current location of the first user device is within the predefined area proximate the first computing device, access stored activity data associated with the first user; determine whether current first user activity associated with the first user device matches stored activity data associated with the first user; responsive to the current first user activity matching the stored activity data beyond a second predetermined threshold, confirm that the current location of the first user device is within the predefined area.

Clause 13: The system of clause 9, wherein determining that at least one of the one or more objects is associated with a human further comprises, for each of the one or more objects: determining a second positional fingerprint; comparing the second positional fingerprint to a stored second fingerprint associated with a presence of a human; and determining that a second object is associated with the presence of a human based on the second positional fingerprint matching the stored second fingerprint beyond a third predetermined threshold.

Clause 14: The system of clause 13, further comprising a trained machine learning model configured to determine the presence of a human based on the comparison of one or more second positional fingerprints to the stored second fingerprint.

Clause 15: The system of clause 9, wherein the security measure comprises one or more actions selected from (i) causing a display associated with the first computing device to flash, (ii) causing the display to temporarily display an empty screen, or (iii) causing the display to identify a position associated with a presence of the human within the predefined area.

Clause 16: The system of clause 9, wherein the memory includes instructions that, when executed by the one or more processors are configured to cause the system to: transmit instructions to the first computing device, the instructions configured to cause the first computing device to execute the security measure; and transmit instructions to the first user device, the instructions configured to cause the first user device to provide an audible or vibrational alert to the first user.

Clause 17: A method comprising: receiving first level authentication data from a first user; based on the first level authentication data, identifying a first user device associated with the first user; determining whether a current location of the first user device is within a predetermined perimeter around a first computing device; responsive to determining that the current location of the first user device is within the predetermined perimeter around the first computing device, detecting, via one or more positional sensors positioned within the predetermined perimeter around the first computing device, one or more objects within the predetermined perimeter around the first computing device; determining that at least one of the one or more objects is associated with a human; responsive to the determination, triggering a security measure; transmitting an indication of the triggered security measure to the first computing device; and transmitting instructions to the first user device, the instructions configured to cause the first user device to provide an audible or vibrational alert to the first user.

Clause 18: The method of clause 17, wherein the security measure comprises one or more actions selected from (i) causing a display associated with the first computing device to flash, (ii) causing the display to temporarily display an empty screen, or (iii) causing the display to identify a position associated with a presence of the human within the predetermined perimeter around the first computing device.

Clause 19: The method of clause 17, wherein determining that at least one of the one or more objects is associated with a human further comprises, for each of the one or more objects: determining a positional fingerprint; comparing the positional fingerprint to a stored fingerprint associated with a presence of a human; and determining that a second object is associated with the presence of a human based on the positional fingerprint matching the stored fingerprint beyond a predetermined threshold.

Clause 20: The method of clause 19, wherein the positional fingerprint and the stored fingerprint each comprise a data type selected from LIDAR fingerprint data, ultrasound fingerprint data, capacitive fingerprint data, resistive fingerprint data, radio-frequency (RF) fingerprint data, facial recognition fingerprint data, or combinations thereof.

Exemplary Use Cases

A user may walk up to a computer interface 130 and insert a debit card and/or enter a PIN associated with the user's account. In response the proximity detection device 120 may identify a first user device associated with the first user. The proximity detection device 120 may determine whether a current location of the first user device (e.g., user device 102) is within a predetermined proximity of the computer interface 130, for example, by querying financial service provider system 140 for locational data associated with user device 102. In response to determining that the current location of the first user device (e.g., user device 102) is within the predetermined proximity of computer interface 130, the system may detect one or more objects within the predetermined proximity of computer interface 130 using one or more positional sensors (e.g., positional sensors 122). The system (e.g., proximity detection device 120) may determine that at least one of the one or more detected objects is associated with a human, and in response, trigger a security measure, and transmit an indication of the triggered security measure to the first computing device. For example, the triggered security measure may include causing a display associated with computer interface 130 to flash, causing the display to temporarily display an empty screen, and/or causing the display to identify a position associated with a presence of the human within the predetermined proximity of the computer interface 130.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
  one or more processors;

one or more positional sensors configured to communicate with the one or more processors;
a memory in communication with the one or more processors and storing instructions that, when executed by the one or more processors, are configured to cause the system to:
receive first level authentication data from a first user during a first user session;
based on the first level authentication data, identify a first user device associated with the first user;
determine whether a current location of the first user device is within a predetermined proximity of a first computing device;
responsive to not determining that the current location of the first user device is within the predetermined proximity of the first computing device:
determine, using the one or more positional sensors, whether the current location of the first user device is within the predetermined proximity of the first computing device;
responsive to determining that the current location of the first user device is within the predetermined proximity of the first computing device or determining, using the one or more positional sensors, that the current location of the first user device is within the predetermined proximity of the first computing device, detect one or more objects within the predetermined proximity of the first computing device using the one or more positional sensors;
determine that at least one of the one or more objects is associated with a human;
responsive to the determination that at least one of the one or more objects is associated with the human, trigger a security measure; and
transmit an indication of the triggered security measure to the first computing device during the first user session.

2. The system of claim 1, wherein determining, using the one or more positional sensors, whether the current location of the first user device is within the predetermined proximity of the first computing device further comprises:
determining a first positional fingerprint associated with the first user;
comparing the first positional fingerprint to a stored fingerprint associated with the first user; and
matching the first positional fingerprint to the stored fingerprint beyond a first predetermined threshold.

3. The system of claim 2, wherein the first positional fingerprint and the stored fingerprint each comprise a data type selected from LIDAR fingerprint data, ultrasound fingerprint data, capacitive fingerprint data, resistive fingerprint data, radio-frequency (RF) fingerprint data, facial recognition fingerprint data, or combinations thereof.

4. The system of claim 1, wherein the memory includes instructions that, when executed by the one or more processors are configured to cause the system to:
responsive to not determining that the current location of the first user device is within the predetermined proximity of the first computing device, access stored activity data associated with the first user;
determine whether current first user activity associated with the first user device matches stored activity data associated with the first user;
responsive to the current first user activity matching the stored activity data beyond a second predetermined threshold, confirm the current location of the first user device is within the predetermined proximity of the first computing device.

5. The system of claim 1, wherein determining that at least one of the one or more objects is associated with a human further comprises, for each of the one or more objects:
determining a second positional fingerprint;
comparing the second positional fingerprint to a stored second fingerprint associated with a presence of a human, and
determining that a second object is associated with the presence of a human based on the second positional fingerprint matching the stored second fingerprint beyond a third predetermined threshold.

6. The system of claim 5, further comprising a trained machine learning model configured to determine the presence of a human based on the comparison of one or more second positional fingerprints to the stored second fingerprint.

7. The system of claim 1, wherein the security measure comprises one or more actions selected from (i) causing a display associated with the first computing device to flash, (ii) causing the display to temporarily display an empty screen, or (iii) causing the display to identify a position associated with a presence of the human within the predetermined proximity of the first computing device.

8. The system of claim 1, wherein an indication of the triggered security measure is additionally transmitted to the first user device, causing the first user device to provide an audible or vibrational alert to the first user.

9. The system of claim 1, wherein the memory includes instructions that, when executed by the one or more processors are configured to cause the system to:
responsive to determining, using the one or more positional sensors, that the current location of the first user device is not within the predetermined proximity of the first computing device, terminate the first user session.

10. A system comprising:
one or more processors;
a memory in communication with the one or more processors and storing instructions that, when executed by the one or more processors, are configured to cause the system to:
receive first level authentication data from a first user;
based on the first level authentication data, identify a first user device associated with the first user;
determine whether a current location of the first user device is within a predefined area proximate a first computing device;
responsive to not determining that the current location of the first user device is within the predefined area proximate the first computing device:
determine a first positional fingerprint;
compare the first positional fingerprint to a stored fingerprint associated with the first user device;
responsive to the first positional fingerprint matching the stored fingerprint beyond a first predetermined threshold, determine the first user is within the predefined area proximate the first computing device;
responsive to determining that the current location of the first user device is within the predefined area proximate the first computing device or determining that the first user is within the predefined area proximate the first computing device, receive object data comprising one or more objects within the predefined area;

determine that at least one of the one or more objects is associated with a human; and responsive to the determination that at least one of the one or more objects is associated with the human, trigger a security measure.

11. The system of claim 10, wherein the first positional fingerprint and the stored fingerprint each comprise a data type selected from LIDAR fingerprint data, ultrasound fingerprint data, capacitive fingerprint data, resistive fingerprint data, radio-frequency (RF) fingerprint data, facial recognition fingerprint data, or combinations thereof.

12. The system of claim 10, wherein the memory includes instructions that, when executed by the one or more processors are configured to cause the system to:

responsive to not determining that the current location of the first user device is within the predefined area proximate the first computing device, access stored activity data associated with the first user;

determine whether current first user activity associated with the first user device matches stored activity data associated with the first user;

responsive to the current first user activity matching the stored activity data beyond a second predetermined threshold, confirm that the current location of the first user device is within the predefined area.

13. The system of claim 10, wherein determining that at least one of the one or more objects is associated with a human further comprises, for each of the one or more objects:

determining a second positional fingerprint;

comparing the second positional fingerprint to a stored second fingerprint associated with a presence of a human; and determining that a second object is associated with the presence of a human based on the second positional fingerprint matching the stored second fingerprint beyond a third predetermined threshold.

14. The system of claim 13, further comprising a trained machine learning model configured to determine the presence of a human based on the comparison of one or more second positional fingerprints to the stored second fingerprint.

15. The system of claim 10, wherein the security measure comprises one or more actions selected from (i) causing a display associated with the first computing device to flash, (ii) causing the display to temporarily display an empty screen, or (iii) causing the display to identify a position associated with a presence of the human within the predefined area.

16. The system of claim 10, wherein the memory includes instructions that, when executed by the one or more processors are configured to cause the system to:

transmit instructions to the first computing device, the instructions configured to cause the first computing device to execute the security measure; and transmit instructions to the first user device, the instructions configured to cause the first user device to provide an audible or vibrational alert to the first user.

17. A method comprising:

receiving first level authentication data from a first user;

based on the first level authentication data, identifying a first user device associated with the first user;

determining that a current location of the first user device is not within a predetermined perimeter around a first computing device;

responsive to determining that the current location of the first user device is not within the predetermined perimeter around the first computing device:

determining, using one or more proximity sensors, that the current location of the first user device is within the predetermined perimeter around the first computing device;

responsive to determining, using the one or more proximity sensors, that the current location of the first user device is within the predetermined perimeter around the first computing device, detecting, via the one or more proximity sensors positioned within the predetermined perimeter around the first computing device, one or more objects within the predetermined perimeter around the first computing device;

determining that at least one of the one or more objects is associated with a human;

responsive to the determination that at least one of the one or more objects is associated with the human, triggering a security measure;

transmitting an indication of the triggered security measure to the first computing device; and transmitting instructions to the first user device, the instructions configured to cause the first user device to provide an audible or vibrational alert to the first user.

18. The method of claim 17, wherein the security measure comprises one or more actions selected from (i) causing a display associated with the first computing device to flash, (ii) causing the display to temporarily display an empty screen, or (iii) causing the display to identify a position associated with a presence of the human within the predetermined perimeter around the first computing device.

19. The method of claim 17, wherein determining that at least one of the one or more objects is associated with a human further comprises, for each of the one or more objects:

determining a positional fingerprint;

comparing the positional fingerprint to a stored fingerprint associated with a presence of a human; and determining that a second object is associated with the presence of a human based on the positional fingerprint matching the stored fingerprint beyond a predetermined threshold.

20. The method of claim 19, wherein the positional fingerprint and the stored fingerprint each comprise a data type selected from LIDAR fingerprint data, ultrasound fingerprint data, capacitive fingerprint data, resistive fingerprint data, radio-frequency (RF) fingerprint data, facial recognition fingerprint data, or combinations thereof.

* * * * *